United States Patent Office 3,629,254
Patented Dec. 21, 1971

3,629,254
PRODUCTION OF 2,4-DISUBSTITUTED TRIAZINES
Heinz Eilingsfeld, Frankenthal, and Horst Scheuermann, Ludwigshafen, Germany, assignors to Badische Anilin- & Soda-Fabrik Aktiengesellschaft, Ludwigshafen (Rhine), Germany
No Drawing. Filed Apr. 4, 1969, Ser. No. 813,704
Claims priority, application Germany, Apr. 6, 1968,
P 17 70 147.2
Int. Cl. C07d 55/50
U.S. Cl. 260—248 CS  8 Claims

ABSTRACT OF THE DISCLOSURE

The production of 2,4-disubstituted triazines by reaction of substituted thiobiurets with esters of formimidic acid. The products of the process are valuable starting materials for the production of dyes and pesticides.

---

It is known that 2-methylmercapto-4-aminotriazine and 2,4-dimethylmercaptotriazine are obtained when S-methyl-isothiourea is reacted with formamide or triformylaminomethane (Chemische Berichte, volume 94 (1961), page 1883). 2-methyl-4-aminotriazine is also obtained in the reaction of S-methylisothiourea with dimethylformamide diethylacetal (Chemische Berichte, volume 97 (1964), page 61).

Dialkylmercaptotriazines may also be prepared by decarboxylation from the corresponding triazine-6-carboxylic acids (Journal of Organic Chemistry, volume 26 (1961), page 957).

It is an object of this invention to provide a new process for the production of 2,4-disubstituted triazines in better yields and higher purity and in a simple manner.

This and other objects of the invention are achieved and 2,4-disubstituted triazines having the general formula:

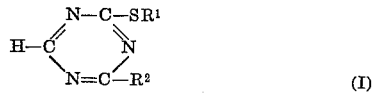

in which $R^1$ denotes an aliphatic, cycloaliphatic, araliphatic or aromatic radical and $R^2$ denotes an amino group or the radical $SR^1$ in which $R^1$ has the above meanings are obtained advantageously by reacting a substituted thiobiuret having the general formula:

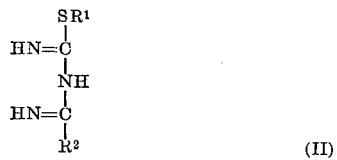

in which $R^1$ and $R^2$ have the meanings given above with an ester of a formimidic acid having the general formula:

or a quarternary iminium salt thereof having the general formula:

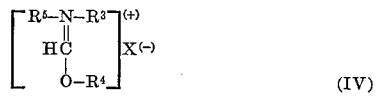

in which the radicals $R^3$, $R^4$ and $R^5$ may be identical or different and each denotes an aliphatic radical, $R^3$ may also denote a hydrogen atom or a cycloaliphatic, araliphatic or aromatic radical, $R^5$ may also denote a hydrogen atom, and X denotes the acid radical of an alkylating agent.

When S,S'-dimethyldithiobiuret and the methyl ester of N-methylformimidic acid are used, the reaction may be represented by the following equation:

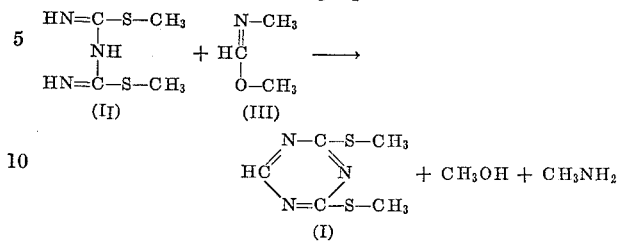

In contrast with prior art methods, the process according to this invention gives a large number of 2,4-disubstituted triazines in better yields and higher purity by a simple method. These results are surprising because having regard to the state of the art it would have been expected that for example the ester of formimidic acid would react with both imino groups of the dithiobiuret and therefore no cyclization would occur.

Preferred substituted thiobiurets having the general Formula II and accordingly preferred end products having the general Formula I are those in whose formulae $R^1$ denotes an alkyl, cycloalkyl, aralkyl or aryl radical having up to ten, particularly up to six, carbon atoms and $R^2$ denotes an amino group or the radical $SR^1$ in which $R^1$ has the said meanings. The said radicals may also bear, as substituents, groups and/or atoms which are inert under the reaction conditions, for example, cyano groups, alkoxy or carbalkoxy groups each having up to six carbon atoms, halogen atoms, nitro groups, and dialkylamino groups having up to six carbon atoms per alkyl group. Instead of the starting materials (II), compounds which form these under the reaction conditions may be used, for example dithiobiurets which are unsubstituted on the sulfur atoms or which bear substituents on only one sulfur atom or unsubstituted guanidinothiourea and alkylating agents. Examples of these alkylating agents are alkyl halides, for example methyl chloride, methyl bromide, ethyl chloride, ethyl bromide, propyl chloride, propyl bromide; dialkyl sulfates, for example dimethyl sulfate, diethyl sulfate, dipropyl sulfate; alkylsulfonic esters, for exampe the methyl, ethyl or propyl esters of benzenesulfonic acid, toluenesulfonic acid, 2,5-dimethylbenzenesulfonic acid, 4-chlorobenzenesulfonic acid, 4-methoxybenzenesulfonic acid. The alkylating agents in the present case are as a rule used in a stiochiometric amount with reference to the dithiobiuret or thiourea, but may be used in an excess of for example up to three times.

For example the following substituted thiobiurets may be used as starting materials (II): S,S'-dimethyldithiobiuret, S,S'-dicyclohexyldithiobiuret, S,S'-dibenzyldithiobiuret, S,S'-diphenyldithiobiuret, S,S'-di-($\beta$-cyanoethyl)-dithiobiuret, S,S'-di-(p-methoxybenzyl)-dithiobiuret, S,S'-di-($\beta$-butoxyethyl)-dithiobiuret, S,S'-di-($\beta$-carbomethoxyethyl)-di-thiobiuret and corresponding guanidinothioureas.

Formimidic acid esters having the general Formula III or their quaternary iminium salts having the general Formula IV are reacted with the starting materials (II) in stiochiometric amounts or in an excess of for example 1 to 2 moles per mole of starting material (II). Preferred starting materials (III) or (IV) are those in whose formulae the individual radicals $R^3$, $R^4$ and $R^5$ are identical or different and each denotes an alkyl radical having up to six carbon atoms, $R^3$ may also denote a hydrogen atom, a cycloalkyl, aralkyl or aryl radical each having up to ten carbon atoms, $R^5$ may also denote a hydrogen atom, and X denotes the acid radical of one of the abovementioned alkylating agents. The said radicals may also bear groups and/or atoms, which are inert under the reaction conditions, for example those mentioned above, as substituents.

For example the following esters of formimidic acid or quaternary iminium salts may be used as starting materials (III) or (IV): the methyl esters of formimidic acid, N-methylformimidic acid, N-cyclohexylformimidic acid, N-benzylformimidic acid and N-phenylformimidic acid, the corresponding ethyl, butyl and propyl esters, and the analogous iminium chlorides, bromides, methosulfates, sulfonates and sulfates quaternized by another methyl, ethyl or propyl group.

Instead of the starting materials (III) or (IV), substances which form these compounds under the reaction conditions may be used. Thus for example formamide, N-alkylformamides or N-dialkylformamides and alkylating agents may be supplied to the reaction; alkylation of the formamide to the starting materials (III) or (IV) and the reaction of this starting material to form the end product (I) takes place in one operation. Formamido chlorides and alkanols (see Chemische Berichte, vol. 96 (1963), p. 2673), which form formimidic esters, may also be used as starting materials for such a combined one-stage process. The abovementioned alkylating agents are used as a rule; they are generally used in an amount of from 1 to 5 moles with reference to 1 mole of formamide. Formamido chlorides bearing one or two substituents on the nitrogen atom may be used as the formamido chlorides, and methanol, ethanol, methyl glycol or propanol may be used as the alkanols. The alkanols are generally used in an amount of from 1 to 20 moles with reference to 1 mole of formamido chloride. When using a formamido chloride and an alkanol it is advantageous to bind the hydrochloric acid liberated by adding a base, for example an alkali metal hydroxide, potassium carbonate or a tertiary amine such as pyridine or triethylamine. These bases are as a rule added in an amount of from 1 to 10 moles per mole of formamido chloride. A particularly advantageous embodiment of the process thus combines four individual operations to form one process:

(i) alkylation of the unsubstituted dithiobiuret or guanidinothiourea;
(ii) production of the formimidic ester from the appropriate formamide;
(iii) dissolving all the components of the mixture with the formamide used acting as solvent; and
(iv) reaction of the starting materials (II), (III) or (IV) formed to give the end product (I).

Reaction is as a rule carried out at a temperature of from −10° to +150° C., preferably from 20° to 100° C., at atmospheric or superatmospheric pressure, continuously or in batches. In many cases one component of the mixture serves at the same time as a solvent, for example formamide, N-dimethylformamide, N-diethylformamide, N-methylformamide, N-ethylformamide or N-propylformamide; in such cases the amounts of these components is advantageously increased to 10 moles with reference to the starting material (II). Organic solvents which are inert under the reaction conditions may be used if desired, e.g. ethers such as tetrahydrofuran and diethyl ether; ketones, such as acetone; aromatic hydrocarbons, such as benzene and xylene; halohydrocarbons, such as trichloroethylene, carbon tetrachloride, and methylene chloride; or mixtures thereof.

The reaction can be carried out as follows: The mixture of starting materials (II) and (III) or (IV) or compounds forming the same, with or without a solvent and/or a base, is kept at the reaction temperature for from ten minutes to five hours. Water is then added to the mixture and the end product is isolated by a conventional method, for example by filtration or by separating the organic phase from the aqueous phase and subjecting it to fractional distillation.

The compounds obtainable by the process according to the invention are valuable starting materials for the production of dyes and pesticides. Thus for example the dyes for dyeing cotton which are described in U.S. patent specification 2,762,797 may be prepared therefrom by reaction with α-aminoanthraquinone.

The invention is illustrated by the following examples, in which the parts specified are parts by weight.

EXAMPLE 1

A mixture of 600 parts of dimethylformamide and 126 parts of dimethyl sulfate is heated for two hours thirty minutes at 35° to 40° C. Then 163 parts of S,S'-dimethyldithiobiuret is added and the mixture is heated for another 90 minutes at 35° to 40° C. 800 parts of water is added and the colorless precipitate is suction filtered, washed with water and dried. The yield is 142 parts (82% of the theory) of 2,4-bis-methylmercapto-s-triazine, melting point 57° to 59° C.

EXAMPLE 2

416 parts of dimethyl sulfate is added at 60° to 65° C. to a solution of 135 parts of dithiobiuret in 600 parts of dimethylformamide. The whole is stirred for another two hours at 65° C., cooled to 40° C., and 202 parts of triethylamine is added. The mixture is kept for two hours at from 40° to 45° C., 800 parts of water is added and the whole is cooled to 10° C. The colorless precipitate is suction filtered. 128 parts (74% of the theory) of 2,4-bis-methylmercapto-s-triazine is obtained. Melting point 58° to 59° C.

EXAMPLE 3

126 parts of dimethyl sulfate is added to 500 parts of formamide and the whole is stirred for two hours at 50° to 60° C. Then, at 10° to 15° C., 163 parts of S,S'-dimethyldithiobiuret is introduced and the mixture is kept for two hours at 40° to 50° C. and then cooled. 700 parts of water is added and the colorless precipitate is suction filtered. 116 parts (67% of the theory) of 2,4-bis-methylmercapto-s-triazine having a melting point of from 57° to 59° C. is obtained.

EXAMPLE 4

A mixture of 500 parts of N-methylformamide and 126 parts of dimethyl sulfate is kept for two hours at 50° C. Then 163 parts of S,S'-dimethyldithiobiuret is added and the reaction mixture is kept at 40° to 50° C. for two hours. Processing as described in Example 3 gives 109 parts (63% of the theory) of 2,4-bis-methylmercapto-s-triazine.

EXAMPLE 5

A mixture of 600 parts of dimethylformamide and 126 parts of dimethyl sulfate is heated for two hours thirty minutes at 45° to 50° C. 244 parts of S-methylguanidino-isothiuronium methosulfate and 101 parts of triethylamine are added at from 20° to 25° C. and the mixture is stirred for another hour at 45° to 50° C. 600 parts of water is added and the colorless precipitate is suction filtered, washed with water and dried. 120 parts (84.5% of the theory) of 2-amino-4-methylmercapto-s-triazine having a melting point of 239° to 241° C. is obtained.

EXAMPLE 6

A mixture of 600 parts of dimethylformamide, 118 parts of guanidinothiourea and 252 parts of dimethyl sulfate is heated for three hours at 40° C. Then 101 parts of triethylamine is added and the temperature is kept at 40° to 45° C. for another two hours. 600 parts of water is added and the colorless precipitate is suction filtered, washed and dried. 102 parts (72% of the theory, of 2-amino-4-methylmercapto-s-triazine having a melting point of 238° to 240° C. is obtained.

EXAMPLE 7

163 parts of S,S'-dimethyldithiobiuret is dissolved in 100 parts of methyl glycol and then at 0° C. 200 parts of dimethylformamide chloride and 350 parts of pyridine are added. The mixture is heated to from 60° to 70° C.

within half an hour, stirred for another hour at this temperature, and cooled and the end product is precipitated with water. 135 parts (78% of the theory) of 2,4-bis-methylmercapto-s-triazine is obtained.

We claim:

1. A process for the production of a 2,4-disubstituted triazine having the formula

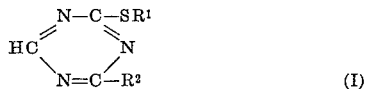 (I)

in which $R^1$ denotes a member selected from the group consisting of alkyl, cycloalkyl, aralkyl and aryl as unsubstituted hydrocarbon radicals of up to ten carbon atoms and the same radicals bearing an inert substituent selected from the group consisting of cyano, halogen, nitro, alkoxy or carbalkoxy of up to six carbon atoms and dialkylamino of up to six carbon atoms in each alkyl group, and $R^2$ denotes an amino group or the radical —$SR^1$ in which $R^1$ has the above meanings, which process comprises reacting a substituted thiobiuret having the formula

 (II)

in which $R^1$ and $R^2$ have the above meanings, with a formimidic acid ester having the formula

 (III)

or with a quaternary iminium salt thereof having the formula

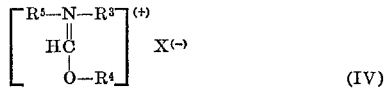 (IV)

in which $R^3$ denotes hydrogen or $R^1$ as defined above, $R^4$ denotes alkyl of up to six carbon atoms or said alkyl bearing an inert substituent selected from the group consisting of cyano, halogen, nitro, alkoxy or carbalkoxy of up to six carbon atoms and dialkylamino of up to six carbon atoms in each alkyl group, $R^5$ denotes hydrogen or $R^4$ as defined above, and X denotes the acid radical of an alkylating agent selected from the group consisting of alkyl halides, dialkyl sulfates and alkyl esters of a benzene sulfonic acid.

2. A process as claimed in claim 1 wherein the reaction is carried out with a dithiobiuret which is unsubstituted on the sulfur atoms or bears a methyl, ethyl or propyl substituent only on one sulfur atom or an unsubstituted guanidinothiourea and an alkylating agent as defined in claim 1 are used instead of starting material (II).

3. A process as claimed in claim 1 wherein the reaction is carried out with a formimidic acid ester having the Formula III or a quaternary iminium salt thereof having the Formula IV in an excess of 1 to 2 moles per mole of starting material (II).

4. A process as claimed in claim 1 wherein the reaction is carried out with formamide, a N-alkylformamide or a N-dialkylformamide and an akylating agent as defined in claim 1 in an amount of from 1 to 5 moles of the alkylating agent with reference to 1 mole of formamide as the starting material instead of with the starting material (III) or (IV).

5. A process as claimed in claim 1 wherein the reaction is carried out with a formamide chloride and an alkanol of 1 to 6 carbon atoms in an amount of said alkanol of from 1 to 20 moles with reference to 1 mole of the formamide chloride in the presence of a base in an amount of said base of from 1 to 10 moles per mole of formamide chloride instead of with starting material (III).

6. A process as claimed in claim 1 carried out at a temperature of from −10° to +150° C.

7. A process as claimed in claim 1 carried out at a temperature of from 20° to 100° C.

8. A process as claimed in claim 1 carried out in the presence of an organic solvent which is inert under the reaction conditions.

References Cited

Smolin et al., "s-Triazines and Derivatives," Interscience Pub. Inc., New York, p. 283 (1959), QD401.S62.

Bredereck et al., Chemische Berichte, vol. 97, pp. 61–6 (1964) QD1D4.

JOHN M. FORD, Primary Examiner

U.S. Cl. X.R.

8—39, 54.2; 260—999